(12) United States Patent
Wang et al.

(10) Patent No.: US 8,890,366 B2
(45) Date of Patent: Nov. 18, 2014

(54) WIRELESS ENERGY TRANSFER USING ARRAY OF RESONANT OBJECTS

(75) Inventors: Bingnan Wang, Boston, MA (US); Koon Hoo Teo, Lexington, MA (US); Da Huang, Durham, NC (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 996 days.

(21) Appl. No.: 12/895,279

(22) Filed: Sep. 30, 2010

(65) Prior Publication Data

US 2012/0080956 A1    Apr. 5, 2012

(51) Int. Cl.
*H01F 27/42*    (2006.01)
*H02J 5/00*    (2006.01)

(52) U.S. Cl.
CPC ..................... *H02J 5/005* (2013.01)
USPC ............. 307/104; 307/9.1; 307/10.2; 307/44; 307/149; 307/151; 363/17; 363/25; 320/108; 323/355; 370/362

(58) Field of Classification Search
CPC .......... H02J 5/005; H02J 7/025; H02J 7/027; H01F 38/14; H04B 5/0081; H04B 5/0087; H03H 7/40; B60L 11/182; Y02T 10/07
USPC ........................... 307/104, 149, 151; 320/108
See application file for complete search history.

(56) References Cited

U.S. PATENT DOCUMENTS

| | | | |
|---|---|---|---|
| 8,378,524 B2 * | 2/2013 | Mita | 307/104 |
| 2009/0015075 A1 * | 1/2009 | Cook et al. | 307/149 |
| 2009/0072627 A1 * | 3/2009 | Cook et al. | 307/104 |
| 2010/0127660 A1 * | 5/2010 | Cook et al. | 320/108 |
| 2010/0164296 A1 * | 7/2010 | Kurs et al. | 307/104 |
| 2010/0201201 A1 | 8/2010 | Mobarhan et al. | |
| 2010/0237709 A1 * | 9/2010 | Hall et al. | 307/104 |
| 2013/0200716 A1 * | 8/2013 | Kesler et al. | 307/104 |

FOREIGN PATENT DOCUMENTS

CN    101471587 A    7/2009

* cited by examiner

*Primary Examiner* — Jared Fureman
*Assistant Examiner* — Jagdeep Dhillon
(74) *Attorney, Agent, or Firm* — Dirk Brinkman; Gene Vinokur

(57) ABSTRACT

A system for exchanging energy wirelessly comprises an array of at least three objects having a resonant frequency, each object is electromagnetic (EM) and non-radiative, and generates an EM near-field in response to receiving the energy, wherein each object in the array is arranged at a distance from all other objects in the array, such that upon receiving the energy the object is strongly coupled to at least one other object in the array via a resonant coupling of evanescent waves; and an energy driver for providing the energy at the resonant frequency to at least one object in the array, such that, during an operation of the system, the energy is distributed from the object to all other objects in the array.

14 Claims, 17 Drawing Sheets

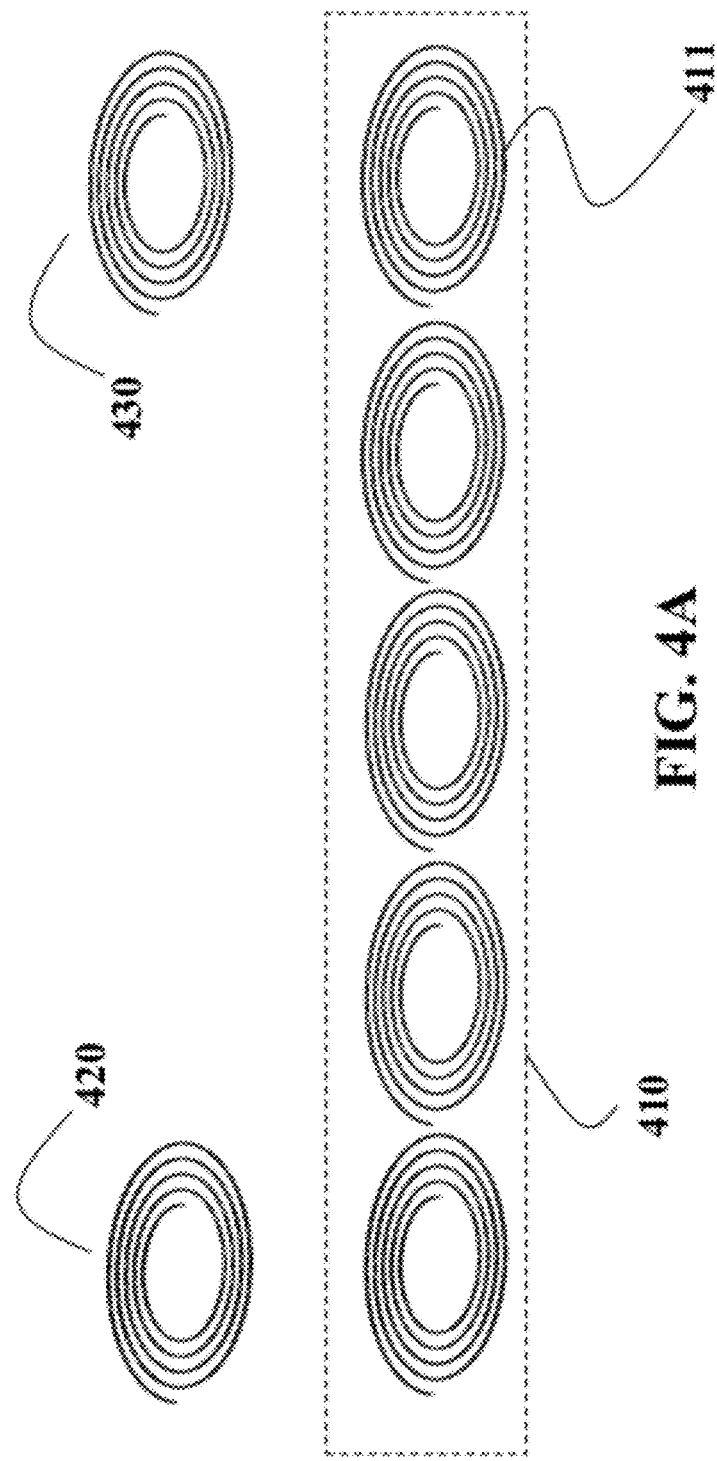

440

450

460

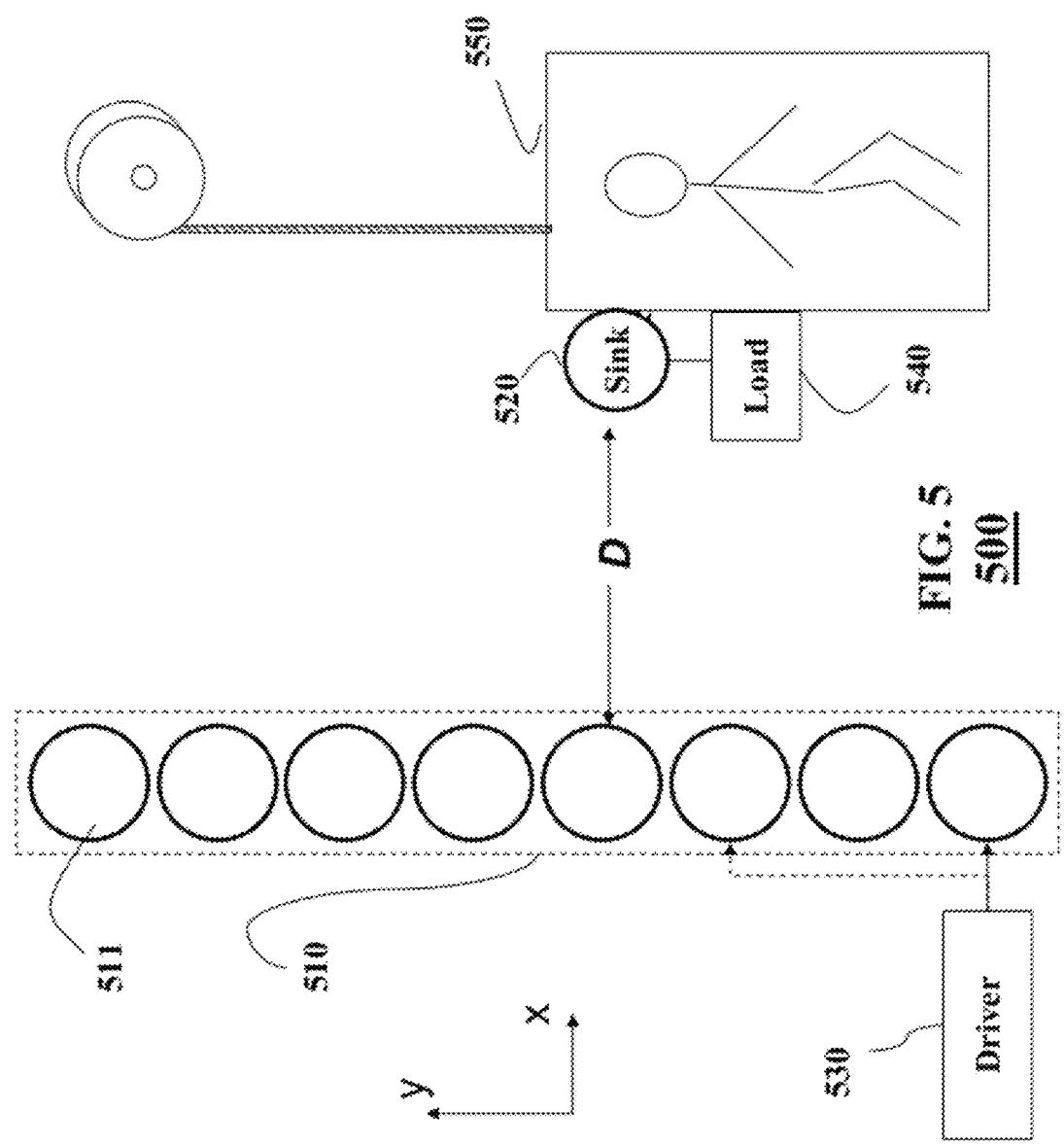

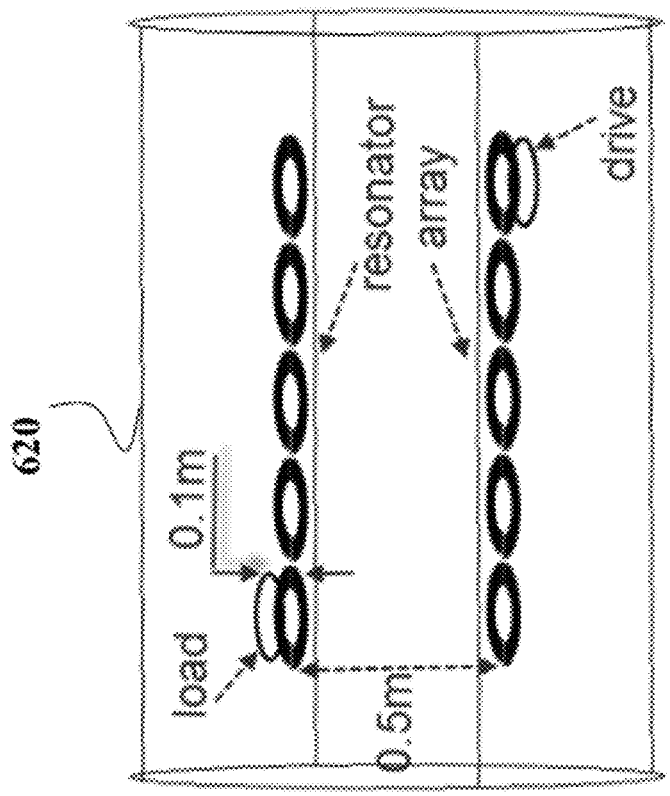
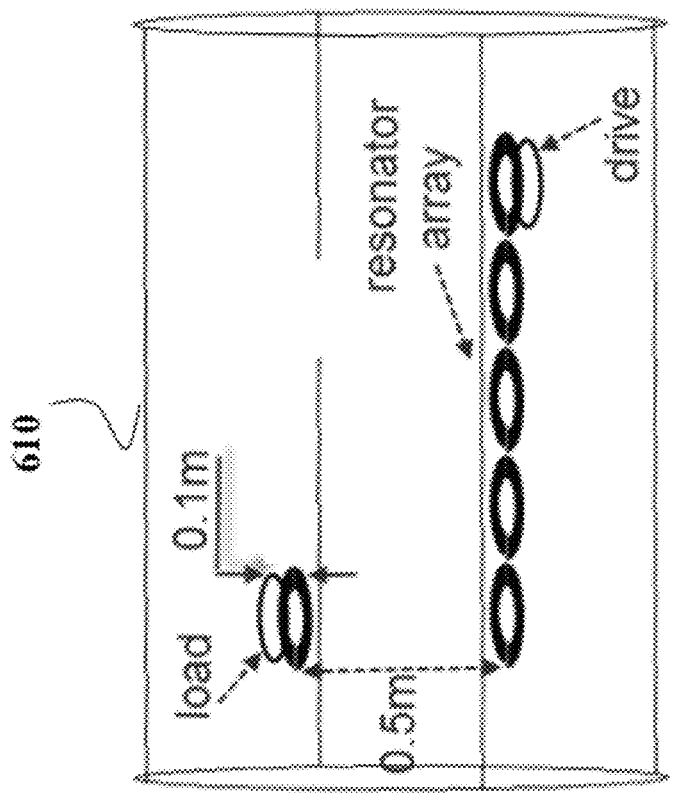
FIG. 6A
FIG. 6B

700

900

1000

1100

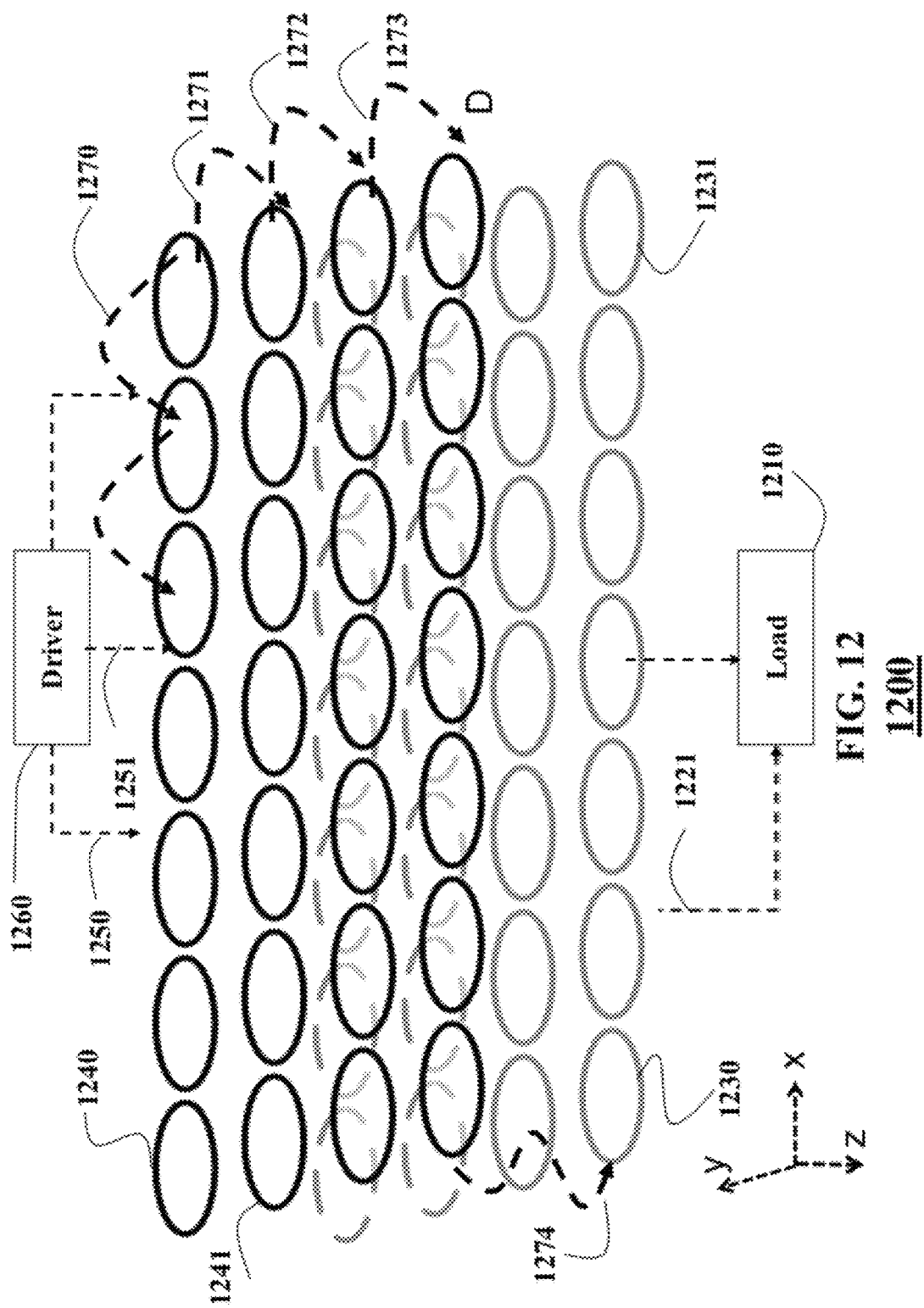

WIRELESS ENERGY TRANSFER USING ARRAY OF RESONANT OBJECTS

FIELD OF THE INVENTION

The present invention relates generally to transferring energy wirelessly, and more particularly to transferring energy using array of resonant objects.

BACKGROUND OF THE INVENTION

Wireless Energy Transfer

Inductive coupling is used in a number of wireless energy transfer systems, such as a cordless electronic toothbrush, or vehicle batteries. In coupled inductors, such as transformers, a source, e.g., a primary coil, generates energy as an electromagnetic field, and a sink, e.g., a secondary coil, subtends that field such that the energy passing through the energy sink is optimized, e.g., the energy generated by the energy sink is as similar as possible to the energy of the energy source. To optimize the energy, a distance between the energy source and the energy sink should be as small as possible, because over greater distances the inductive coupling method is highly ineffective.

Resonant Coupling System

FIG. 1 shows a conventional resonant coupling system 100 for transferring energy from a resonant source 110 to a resonant sink 120. In resonant coupling, two resonant electromagnetic objects, i.e., the energy source and the energy sink, interact with each other under resonance conditions.

A driver 140 inputs the energy into the resonant source to form an oscillating electromagnetic field 115. The excited electromagnetic field attenuates at a rate with respect to the excitation signal frequency at driver or self-resonant frequency of source and sink for a resonant system. However, if the resonant sink absorbs more energy than is lost during each cycle, then most of the energy is transferred to the energy sink. Operating the resonant source and the resonant sink at the same resonant frequency ensures that the resonant sink has low impedance at that frequency, and that the energy is optimally absorbed.

The energy is transferred, over a distance D, between resonant objects, e.g., the resonant source has a length $L_1$ and the resonant sink has a length $L_2$. The driver connects a power provider to the energy source. The resonant sink is connected to a power consuming device, e.g., a resistive load 150. Energy is supplied by the driver to the resonant source, transferred wirelessly and non-radiatively from the resonant source to the resonant sink, and consumed by the load. The wireless non-radiative energy transfer is performed using the field 115, e.g., the electromagnetic field or an acoustic field of the resonant system. For simplicity of this description, the field 115 is an electromagnetic field. During the coupling of the resonant objects, evanescent waves 130 are propagated between the resonant source and the resonant sink.

However, the resonant coupling transfers energy from the energy source to the energy sink over a mid-range distance, e.g., a few times of the resonant frequency wavelength, inefficient when the distance becomes longer. It is thus desirable to extend the range of efficient wireless energy transfer.

SUMMARY OF THE INVENTION

The embodiments of the invention are based on a realization that an array of strongly coupled resonant objects extends the range of efficient wireless energy transfer and facilitates an efficient energy transfer to receiving objects moving over a large distance.

Embodiments of the invention are based on another realization that, if the energy is provided to at least one object of an array of strongly coupled resonant objects, the energy oscillates among all objects in the array with reasonable losses. If the energy is provided to at least one object in the array, the energy is distributed from the object to all other objects in the array. Thus, the energy sink can receive energy wirelessly from any object of the array. Accordingly, the embodiments of the invention provide a novel way to store and distribute energy for subsequent wireless retrieval of the energy at any desired direction and distance from the energy driver.

In conventional energy distribution systems, the energy is transmitted over a closed loop to return the unused energy back to the energy source or to other specially designed energy storages. That was not considered as a problem, but rather as a fact of the energy transfer. The embodiments of the invention eliminate this requirement allowing arbitrarily arrangements of the objects and thus, arbitrarily configuration of energy distribution topography.

In one embodiment, a system configured to transfer energy wirelessly between a transmitting device and a receiving device is provided. The system comprises an energy source, which is formed by an array of resonant objects, to generate evanescent electromagnetic (EM) waves. The system further comprises an energy driver for providing the energy to at least one object in the array, such that, during an operation of the system, the energy is distributed, e.g., oscillated, from the object to all other objects in the array.

In one variation of this embodiment, the system further comprises an energy sink at a distance from the energy source for receiving energy wirelessly from the energy source via coupling of evanescent EM waves. The energy sink can be resonant or non-resonant structures. The energy transfer can be achieved from any resonant object in the array of the energy source.

Another embodiment discloses a system configured to exchange energy wirelessly, comprising: an energy source comprising a first array of objects; an energy sink comprising a second array of objects, each object in the energy source and energy sink has a resonant frequency, is electromagnetic (EM) and non-radiative, and is configured to generate an EM near-field in response to receiving the energy; an energy driver for providing the energy at the resonant frequency to at least one object in the energy source, such that, during an operation of the system, the energy is distributed from the object in the energy source to all other objects in the energy source; and a load from receiving the energy from the energy sink, wherein each object in the first and the second arrays is arranged at a distance from all other objects in, respectively, the first and the second arrays, such that upon receiving the energy the objects in the first and the second arrays are strongly coupled to, respectively, at least one other object in the first and the second array, via a resonant coupling of evanescent waves, and wherein the energy sink is arranged to receive energy wirelessly from the energy source via the resonant coupling of one or many objects in the first array with one or many objects in the second array.

In another embodiment, a method of transferring energy wirelessly between an energy source and an energy sink is disclosed. The method comprises generating evanescent EM waves in an array of resonant objects. The method further comprises transferring energy wirelessly between the array of resonant objects and an energy sink. The energy sink can be a resonant or non-resonant structure. In another embodiment, the method further comprises transferring the energy wirelessly between the array of resonant objects and another array of resonant objects.

BRIEF DESCRIPTION OF THE DRAWINGS

FIGS. 4A-D are schematics of an array of strongly coupled resonant objects according to embodiments of the invention;

FIG. 5 is block diagram of a system for supplying energy wirelessly to moving objects according to embodiments of the invention;

FIGS. 6A-C are schematics comparing different implementations of an energy sink;

FIG. 12 is a schematic of an example of one dimensional system extended to two dimensional plane systems according to embodiments of the invention.

DETAILED DESCRIPTION OF THE PREFERRED EMBODIMENTS

Energy can be transferred wirelessly and efficiently between coupled resonant objects at a resonant frequency. With the size of resonant object is much smaller than the resonant wavelength, most of the energy is stored inside the resonant object and does not radiate into free space. The range of efficient wireless energy transfer depends on the physical size of resonant objects. The energy transfer is inefficient when the receiving object moves over a large distance, compared to the size of resonant objects.

Figure 1:
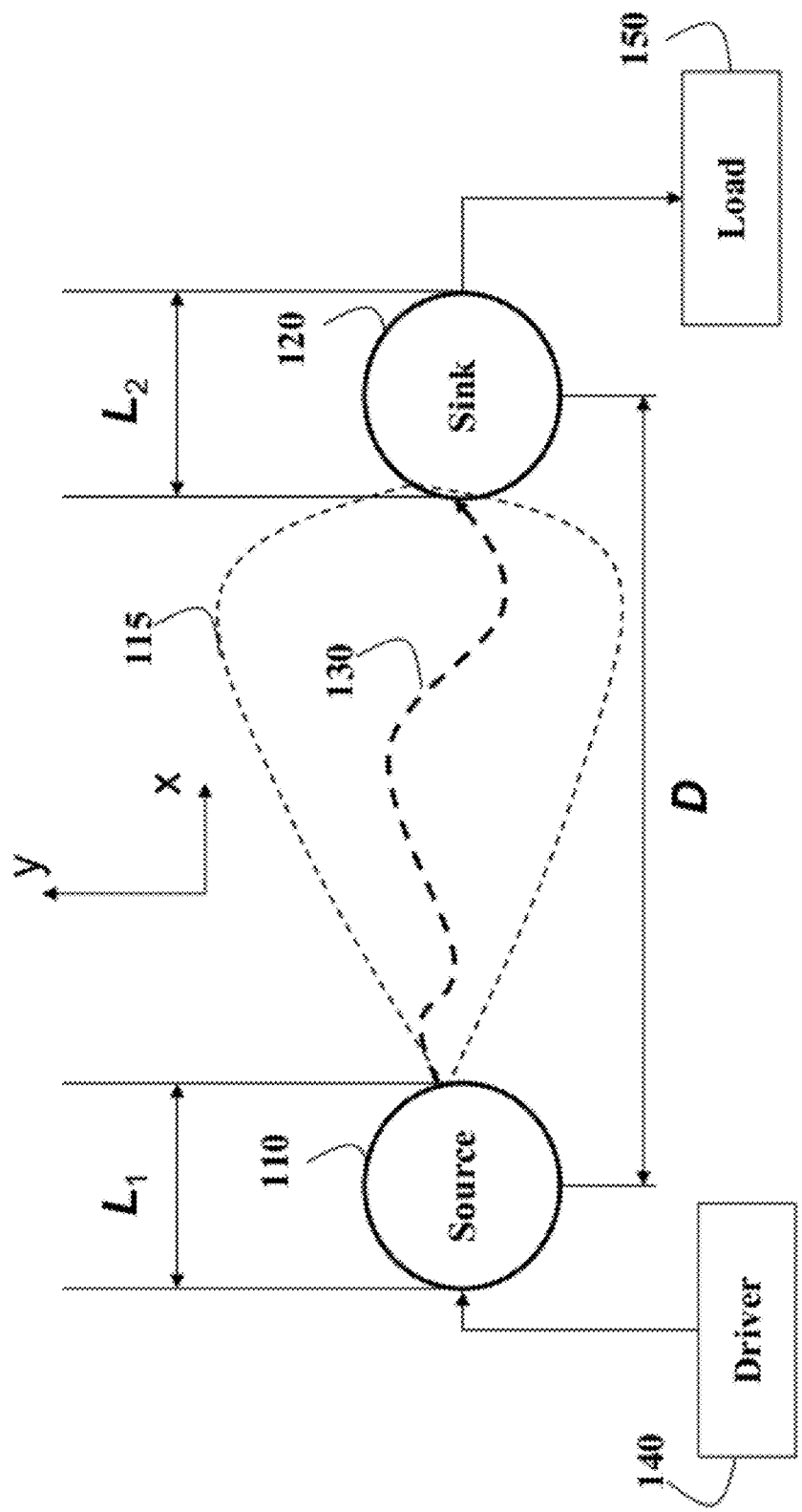
FIG. 1 is a block diagram of a conventional resonant coupling system.

Thus, the resonant energy transfer system shown in FIG. 1 is efficient when the distance D is on the order of the energy source size $L_1$ and the energy sink size $L_2$. When D is much larger than the sizes $L_1$ or $L_2$, the energy transfer system becomes inefficient. Moreover, depending on the structure design of source 110 and sink 120, the system usually requires good alignment along one axis.

Figure 2:
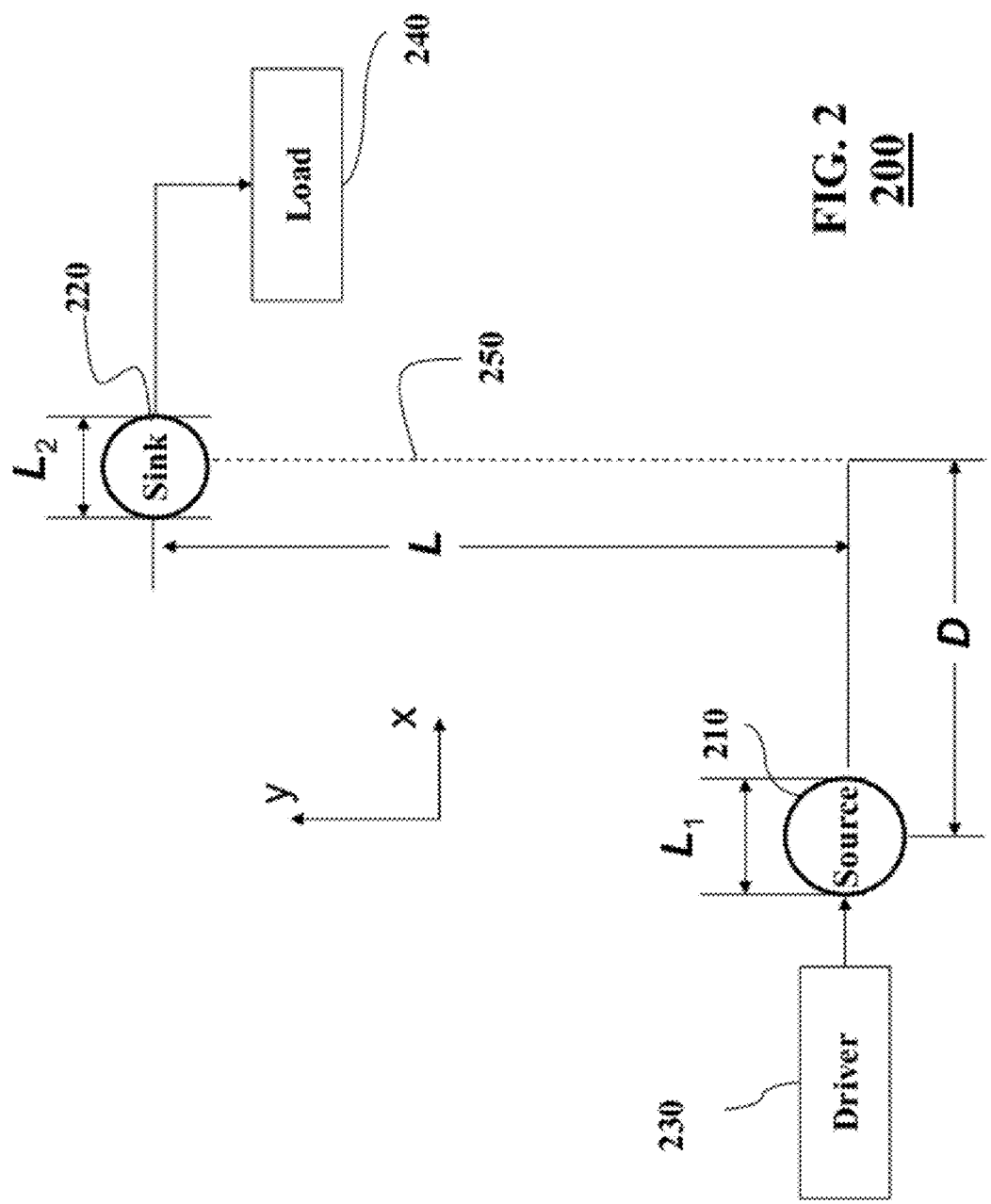
FIG. 2 is a block diagram of a system with an energy sink beyond a range of efficient wireless energy transfer according to embodiments of the invention.

FIG. 2 shows an example when the wireless energy transfer using resonant energy source 210 and resonant energy sink 220 is inefficient. The energy sink 220 is a distance D in the x direction and a distance L in the y direction from the energy source 210, where the distance L is much larger than $L_1$ and $L_2$. Moreover, the energy sink 220 can move along a direction line 250. Thus, it is desirable to extend the range of efficient wireless energy transfer and design a system to provide energy wirelessly to mobile devices, such as elevators or electric vehicles.

The embodiments of the invention are based on a realization that an array of strongly coupled resonant objects extends the range of efficient wireless energy transfer and facilitates an efficient energy transfer to receiving objects moving over a large distance.

Coupled Resonator Array

Figure 3:
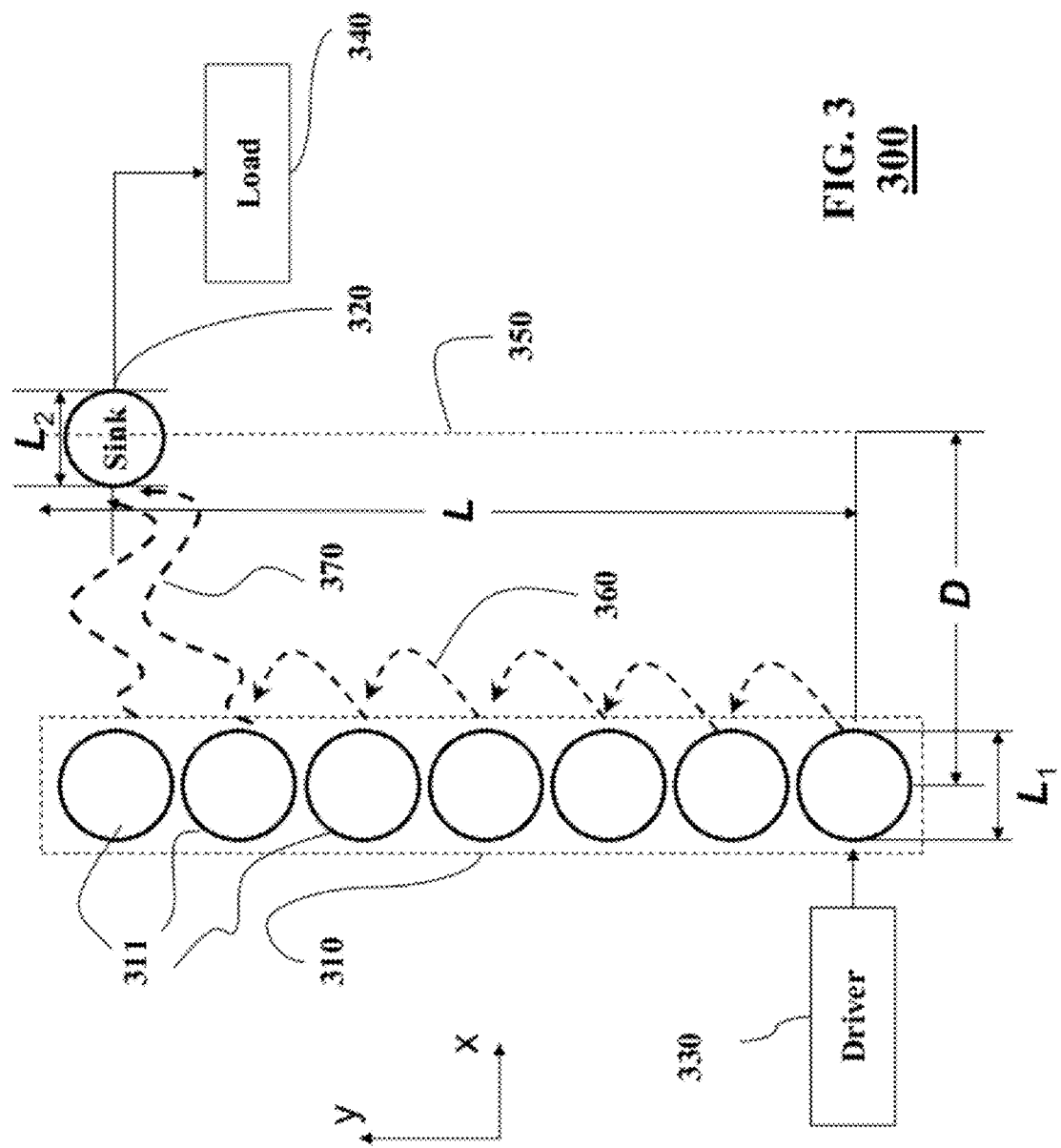
FIG. 3 is a block diagram of a system with a resonator array as an energy source according to embodiments of the invention.

FIG. 3 shows a system 300 according to embodiments of the invention. Instead of using one resonant object as the energy source, an array of at least three resonant objects 311 having the same resonant frequency is used as the energy source 310. Each object is electromagnetic (EM) and non-radiative, and configured to generate an EM near-field in response to receiving the energy. The array 310 can be any arrangement of the objects 311. The objects 311 in the array are arranged at a distance from each other, i.e., not physically connected, such that upon receiving the energy the object is strongly coupled to at least one other object in the array via resonant coupling of an electromagnetic wave 360.

The type of resonant coupling in the array can be an inductive coupling, a capacitive coupling, or combination thereof. An energy driver 330 is used to provide energy to one or more objects in the array 310. Through the resonant coupling, the energy is distributed to all the objects in the array 310. The energy distribution in the array is achieved by the excitation of the evanescent waves 360 that propagate along the objects of the array due to the resonant coupling. The evanescent wave is localized within the near-field of the resonant objects and does not radiate to free space. In one embodiment, to reduce the loss during the process, resonant objects with high quality factor (Q-factor, Q>100) are selected.

An energy sink 320 is a distance D away from the array. The energy sink can be constructed as a resonant object or a non-resonant object. The energy is transferred from the energy source 310 to the energy sink 320 via coupling of evanescent waves 370. The coupling can occur between one or more objects in the energy source and the energy sink. The energy sink receives energy wirelessly from the energy source and provides energy to a load 340. The energy sink can be at different locations along the line 350. Different objects in the energy source 310 are coupled to the energy sink 320 when the energy sink is at different locations.

Embodiments of the invention are based on a realization that if the energy is provided to at least one object of an array of strongly coupled resonant objects, the energy oscillates among all objects in the array with reasonable losses. If the energy is provided to at least one object in the array, then the energy is distributed from the object to all other objects in the array. Thus, the energy sink can receive energy wirelessly from any object of the array. Accordingly, the embodiments of the invention provide a way to store and distribute energy for subsequent wireless retrieval of the energy at any desired direction and desistance from the energy driver.

In conventional energy distribution systems, the energy is transmitted over a closed loop to return unused energy to the energy source or to other specially design energy storages. That was not considered as a problem, but rather as a fact of the energy transfer. The embodiments of the invention eliminate this requirement and allow arbitrarily arrangements of the objects and thus, arbitrarily configuration of energy distribution topography.

Array Configurations

The resonant object 311 in the resonant array 310 can take any physical shape depending on the application. For example, the resonant object can be self-resonant coils, spirals, and dielectric resonators.

In one embodiment as shown in FIG. 4A, the resonant object has the form of a planar spiral 411. The resonant object can form different arrangement forming the array of different shapes. An array 410 is formed by linearly arranging multiple resonant objects. The spiral object 411 is made of conducting wires and is self-resonant at the resonant frequency. The energy sink can include one or more objects constructed with resonant or non-resonant structures. In one embodiment, the energy sink is constructed by the spiral 420, and arranged on top of one of the objects of the array 410. In another embodiment, the energy sink are movable between a current and another location 430. In yet another embodiment, multiple energy sinks 420 and 430 are used at different locations.

Figure 4B:
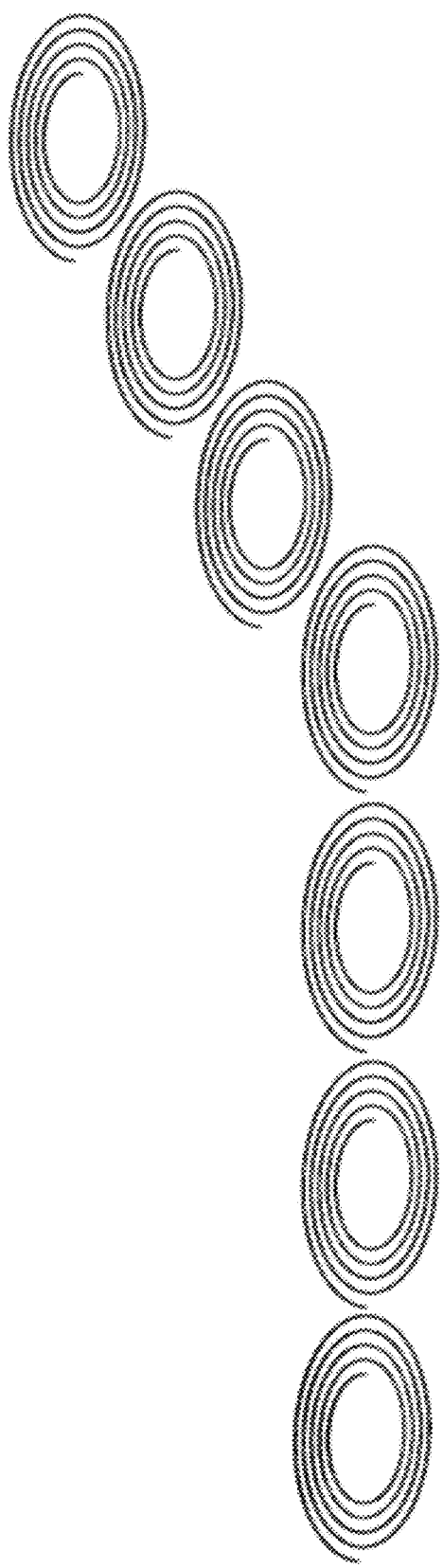
Figure 4C:
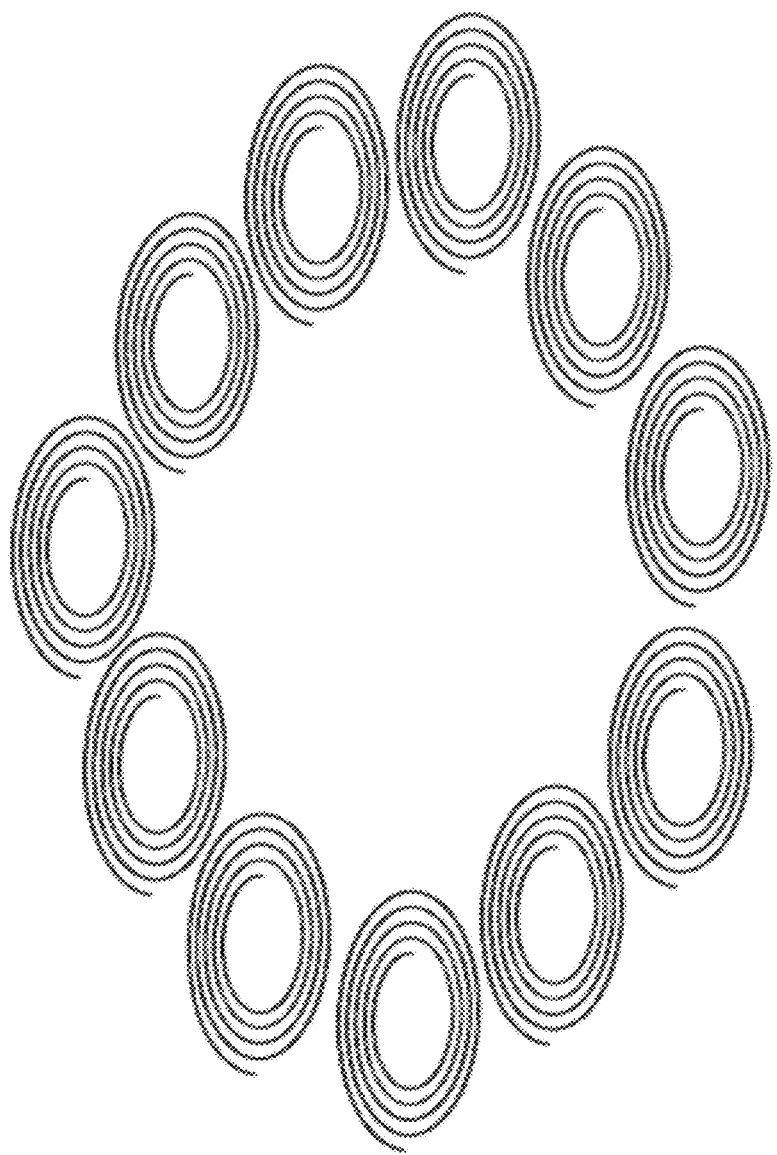
Figure 4D:
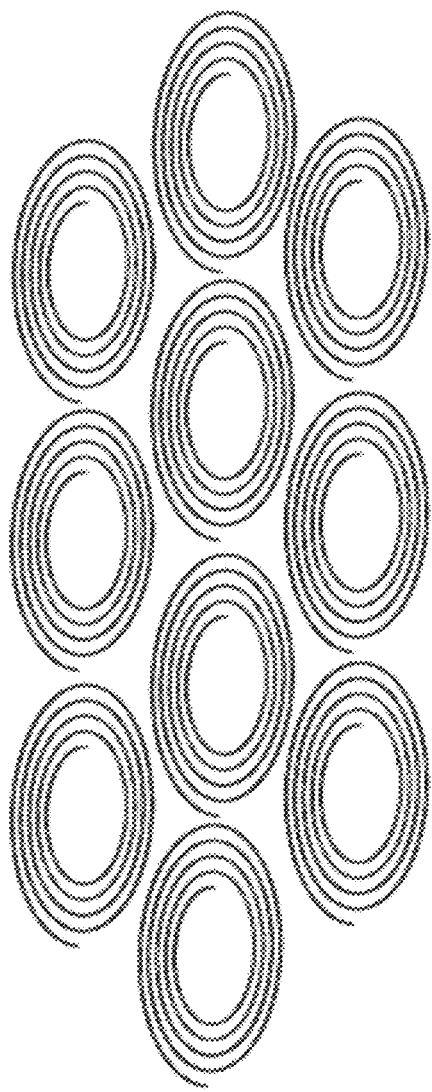

FIGS. 4B-D show more complex shapes of the array. FIG. 4B shows an array 440 of resonant objects arranged a curve. In another embodiment as shown in FIG. 4C, the resonant objects are arranged along a circle 450. In yet another embodiment as shown in FIG. 4D, the resonant objects can be arranged in two dimensions in a plane 460. In various embodiments, the energy sink is a resonant object having the resonant frequency for receiving the energy wirelessly.

Example Applications

The embodiments of the invention can be applied to various applications to provide energy wirelessly to mobile devices, or wirelessly charge batteries on different devices. The devices include, but are not limited to, electric vehicles, elevators, robots, electronic devices such as cell phones, laptops.

FIG. 5 shows a system 500 for providing the energy wirelessly to an elevator 550. The energy source is formed by an array 510 of resonant objects 511, and is installed at a hoist way. A driver 530 is used to provide energy to one or more objects in the array 510. The driver 530 is connected to a power grid. The energy sink 520 is a resonant object, and connected to a load 540 of the elevator for powering the elevator cage. The energy sink 520 receives energy wirelessly from the energy source, and provides energy to the load 540. Both the energy sink 520 and the load 540 are positioned outside of the elevator cage 550. Impedance matching networks and other components (not shown) can be used to control and optimize the performance of the elevator system. The system can be adapted to other applications such as wireless charging of electric vehicles.

Resonator Array as Energy Sink

Figure 6C:
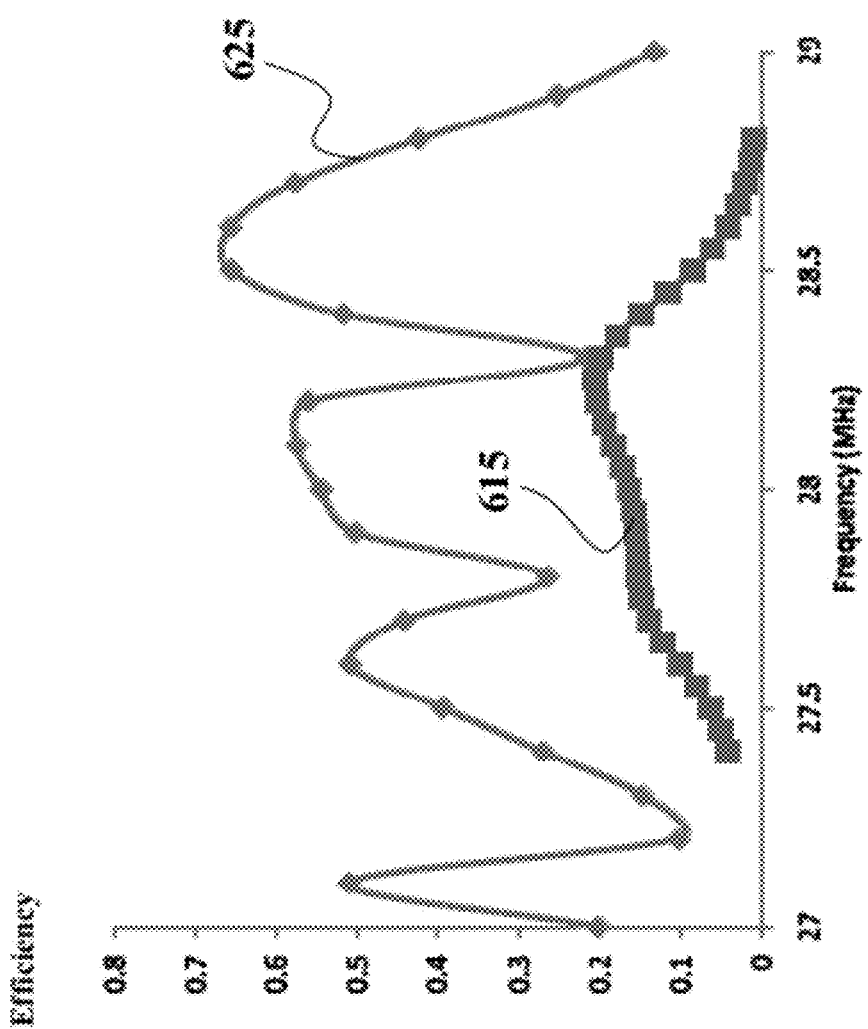

Some embodiments of the invention use the energy sink formed by an array of resonators. FIGS. 6A-6B show examples of systems 610 and 620 having different energy sink configurations. In both systems, the energy source is constructed by spirals aligned in a linear array. A loop antenna is used at the driver to provide energy to the resonant spiral at one end of the array. In the system 610, the energy sink is an identical spiral resonator and is aligned coaxial with the resonant spiral at the other end of the array. The energy sink is 0.5 m away from the plane of the array. A loop antenna is used to extract energy from the energy sink. In system 620, the energy sink is constructed by an array of identical spirals. A loop antenna is aligned coaxial with the spiral at one end of the array. FIG. 6C shows the transfer efficiency 625 of the system 620 is better than the transfer efficiency 615 in the system 610.

Two Coupled Resonator Arrays

Figure 7:
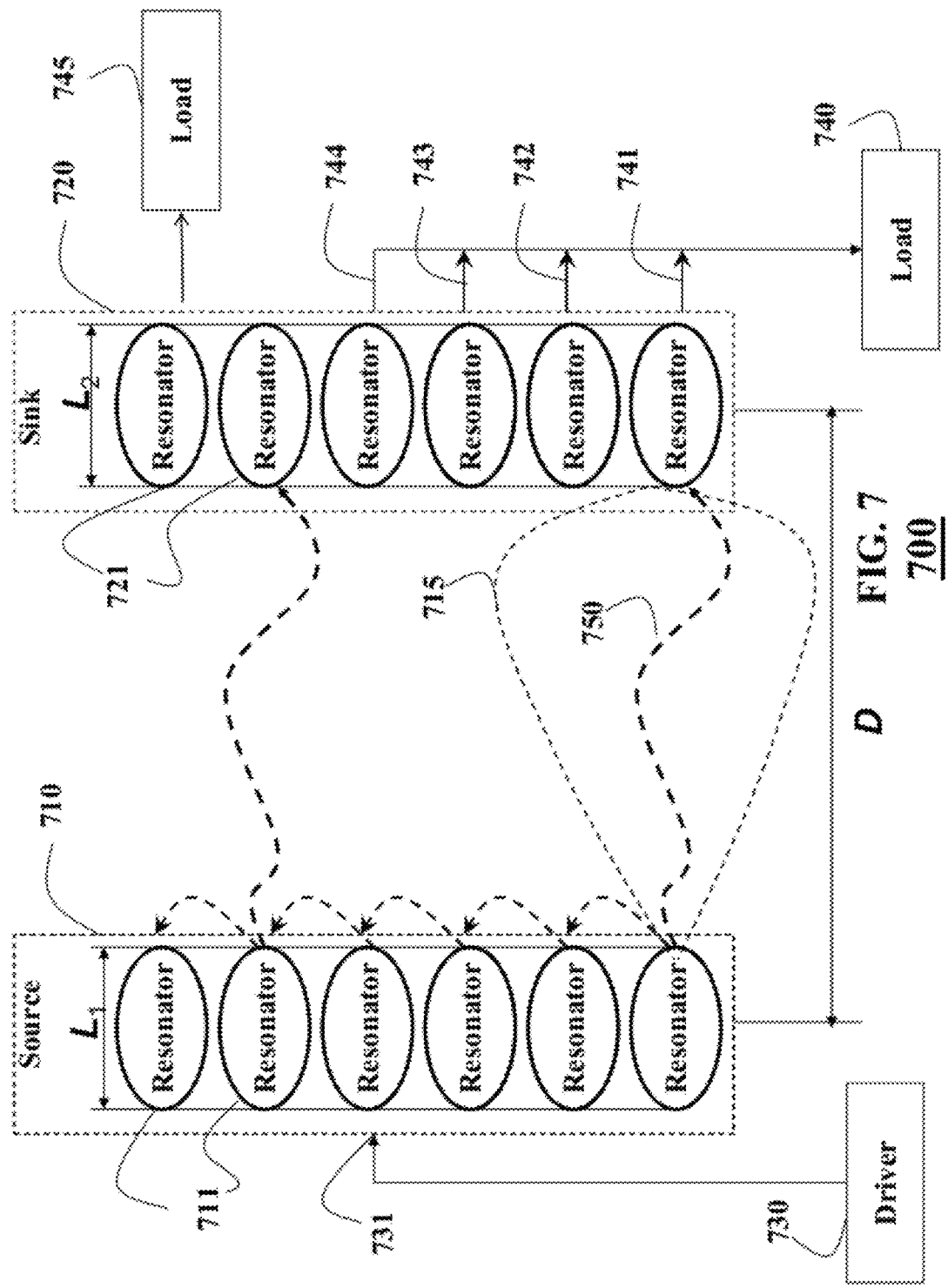
FIG. 7 is a block diagram of a system with a resonator array as the energy source and the energy sink according to embodiments of the invention.

FIG. 7 shows a system 700 including a pair of resonator arrays, i.e., a first array 710 and a second array 720, for wireless energy transfer. The energy oscillating at resonant frequency is provided to the energy source 710 from the drive 730. The energy can be provided wirelessly. The energy source 710 and the energy sink 720 are arrays of resonant objects 711 and 721. Mutual coupling between the resonant objects in the energy source and the energy sink redistributes the wireless energy in the system according to the resonant arrays configuration. Typically, the distance between objects of, respectively, the first and the second arrays, is less than a distance between the energy source and the energy sink.

The mutual coupling between the arrays 710 and 720 supports the wireless energy transfer through the near field 750 over mid-range, e.g., several resonant object dimension size. The energy is transferred from the energy source to the energy sink via coupling of one or more resonant objects in the energy source with one or more resonant objects in the energy sink. The overall filed distribution due to the mutual coupling forms a coupled mode of the two resonator arrays of a single system.

In various embodiments, the resonant objects 711 and 721 are of different shape and geometry. The resonant frequency can vary between the energy source and the energy sink. However, one embodiment maintains the same resonant frequency for both resonant objects 711 and 721 in order to achieve the optimum energy transfer efficiency.

In various embodiments, a size of the first array is less, greater, or equal a size of the second array. The first and the second arrays can be of the same or different dimensions. The first and the second arrays can have the same or different degrees of freedom. In one embodiment, the second array has at least one degree of freedom.

In some embodiment, the driver can provide energy to one or to several resonant objects concurrently. Also, in one embodiment, a driver feeding position 731 can move. The system resonating frequencies and the resonant mode for each resonant frequency are fixed after the system configuration, i.e., the objects of the energy source and the energy sink, are determined. The driver 730 can provide energy to the system at any resonator object 711 in the energy source 710.

Similarly, in one embodiment, the load energy extraction position can move. The energy can be extracted from any resonant object 721 of the energy sink. In variation of this embodiment, the load 740 can extract energy from more than one object in the array of the energy sink, e.g., at different positions 741, 742, 743 and 744.

In some embodiments, multiple drivers in the system 700 can be used to provide energy to the energy source array 710 at different positions. Similarly, multiple loads 740 and 745 can be used to extract energy from the energy sink 720 at different positions.

Moving Device

Figure 8:
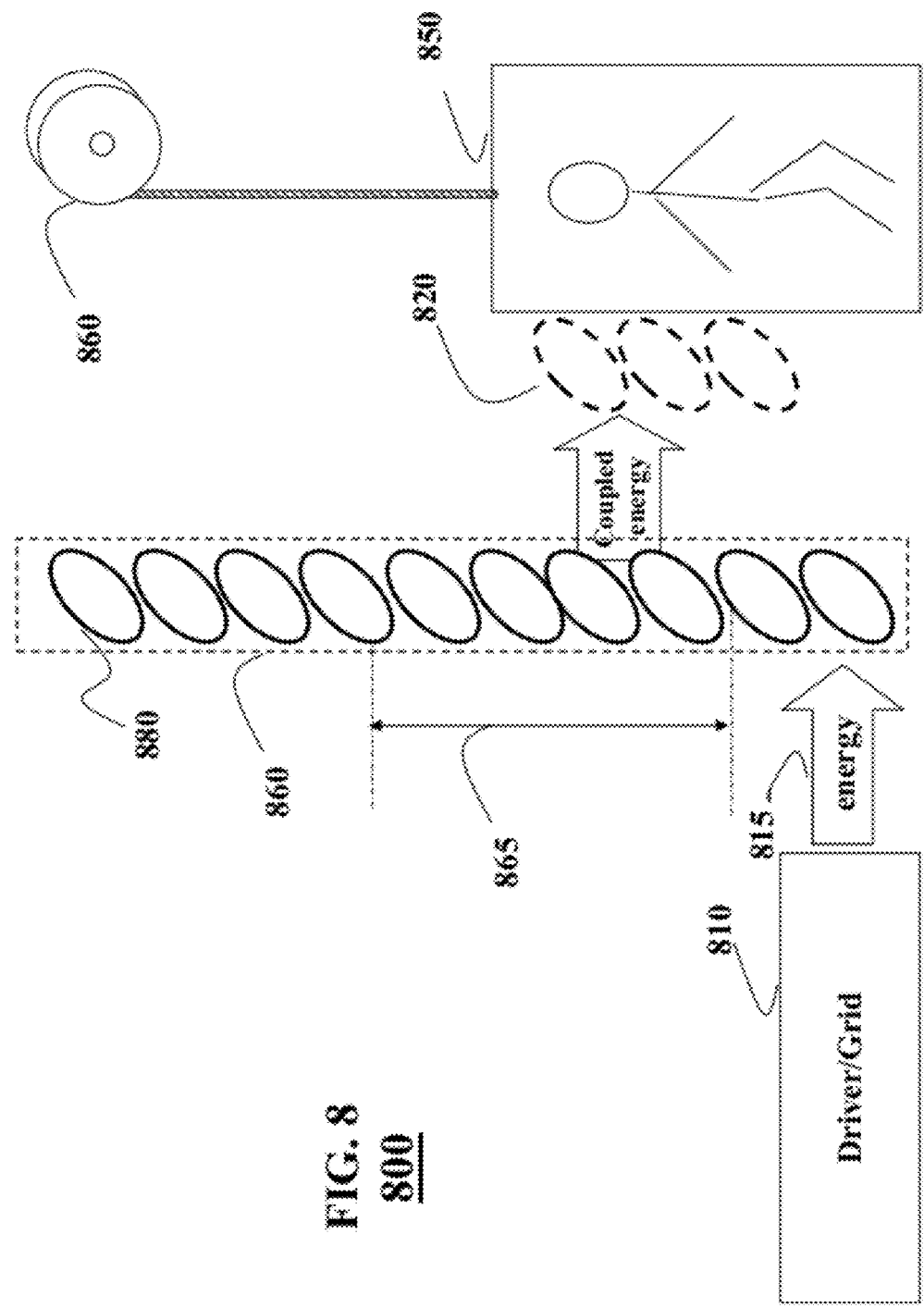
FIG. 8 is block diagram of a system for supplying energy wirelessly to moving objects according to embodiments of the invention.

FIG. 8 shows a system 800 for supplying energy wirelessly to a moving devices, such as elevators. The energy source is an array 860 of resonant objects 880. The energy source is installed at a hoistway and receives energy 815 from an energy driver 810. The energy driver can be connected to a power grid and supply energy to the energy source, e.g., inductively. The resonator array is configured to generate electromagnetic evanescent waves in the specified resonant mode at specified resonant frequency.

An less elevator car 850, i.e., the load, is connected wirelessly to the energy sink formed by a resonator array 820. The energy sink can have less, more or the same number of resonant objects as the resonator array of the energy source.

EXAMPLE

Figure 9:
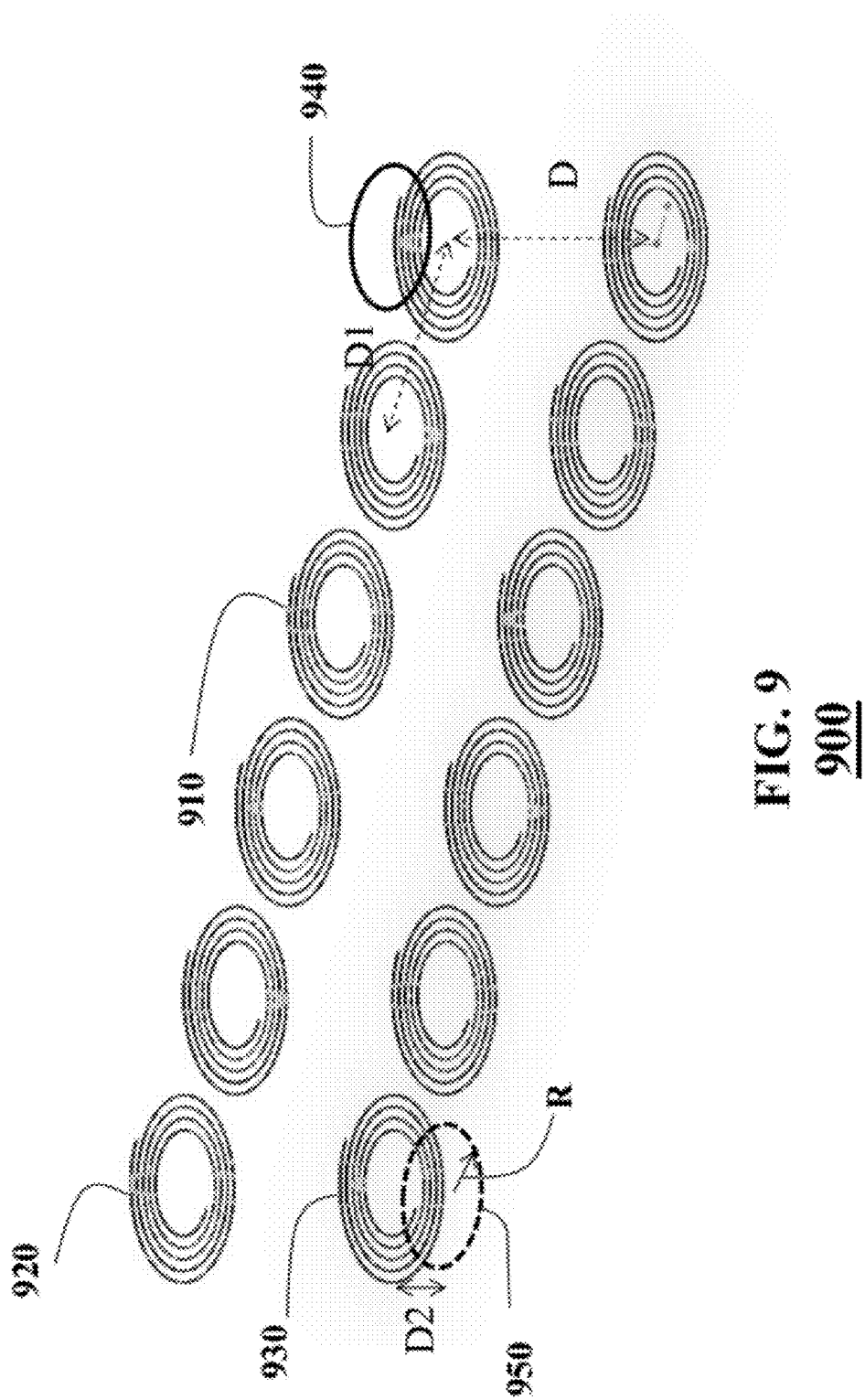
FIG. 9 is a schematic of an array of spiral operating resonators according to embodiments of the invention.

FIG. 9 shows another example embodiment. Spiral resonators 910 resonating at 27 MHz form the resonator arrays of the energy source 920 and the energy sink 930. For example, both resonator arrays have 6 spiral elements. Two loop antennas with R radius are used as the energy driver 940 and the load 950. The separation between driver/load and source array/sink array is D2. The distance between the energy source and sink array is D.

For example, the energy is provided to the energy driver 940 via wired cable and then provided to the energy source via, e.g., inductive coupling at resonant frequency. The specified resonant mode is excited in the system and the energy redistributed over the whole system according to the resonant mode. The load 950 extracts the energy wireless out of the system from the energy sink 930. When the energy is extracted from the system, energy balance of the system is disturbed and more energy is provided from the driver 940 to maintain the balance. Accordingly, the energy transferred from drive 940 to load 950 continues as long as the resonant mode is maintained in the system.

Figure 10A:
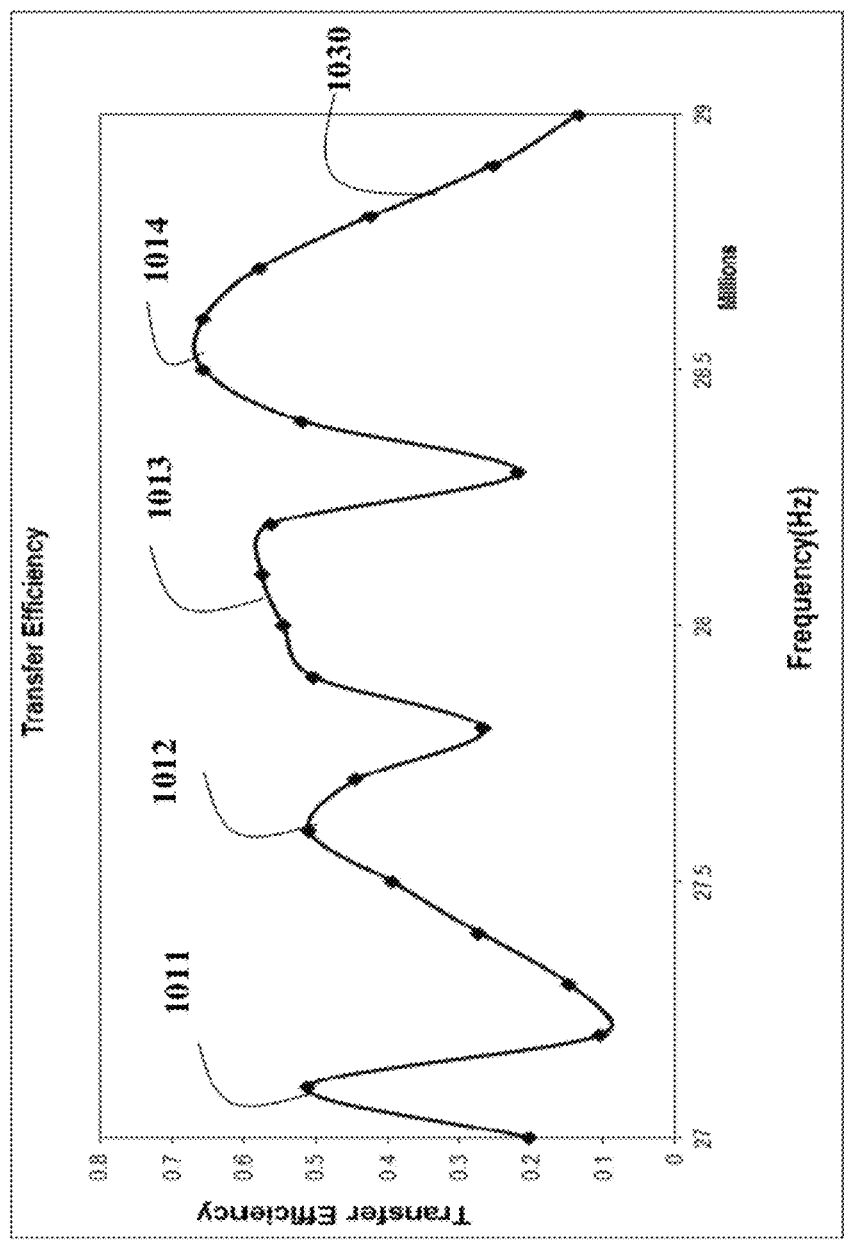
FIGS. 10A-E are graphs of transfer efficiency as a function of frequency in the resonant array system and corresponding resonant modes according to embodiments of the invention.
Figures 10B, 10C, 10D, 10E:
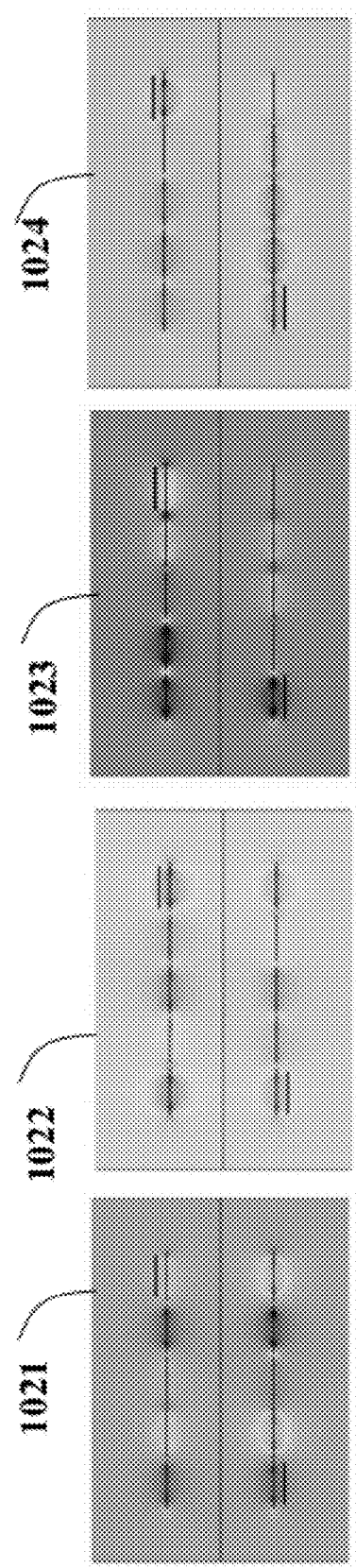

Because the resonant mode of the system is frequency dependent, the transfer efficiency is also frequency dependent, as shown in FIG. 10A. The energy transfer efficiency 1030 has multiple peaks in the system which is the result of the multiple resonator configurations.

Different peaks in the power transfer efficiency curve, 1011 to 1014, correspond to different corresponding resonant modes 1021 to 1024 as shown in FIGS. 10B-10E. When the resonant mode common to the whole system is excited, the energy is confined within the system with little radiation.

In particular, the highest power transfer efficiency from the driver to the load is at the resonant mode where the energy is evenly distributed over the all system, which is the peak 1014.

Figure 11:
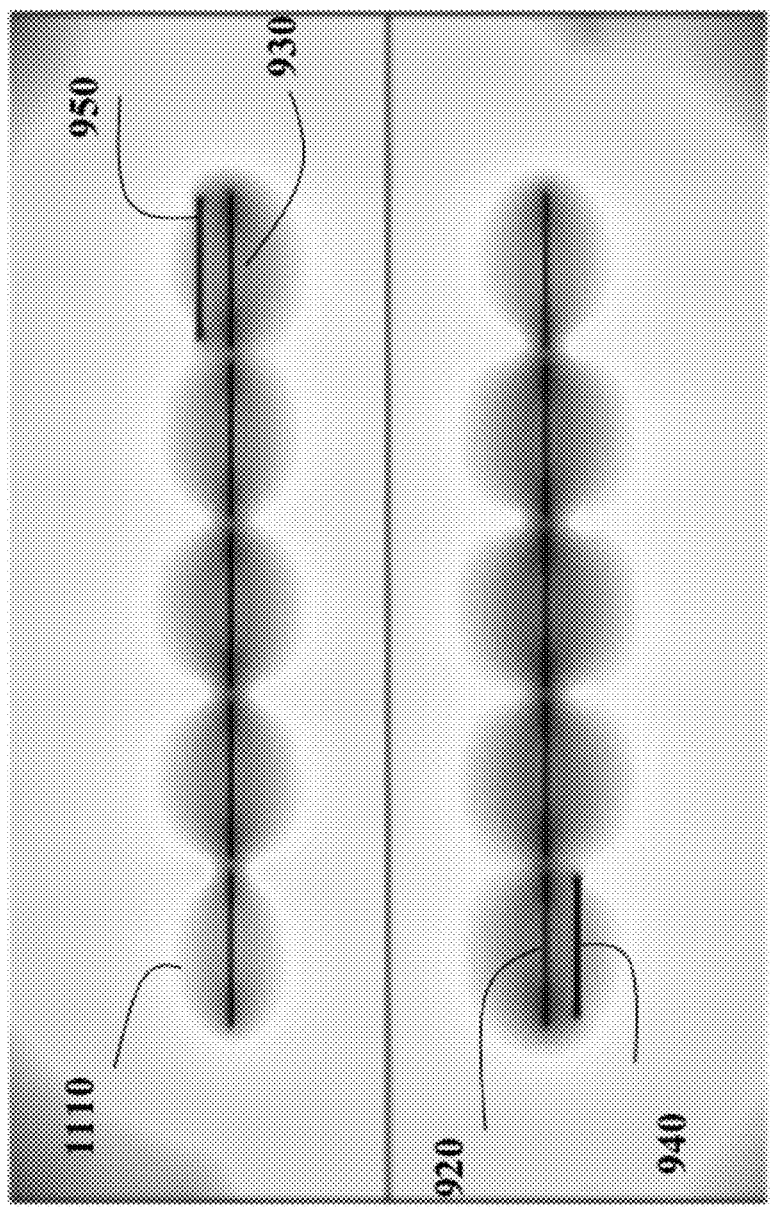
FIG. 11 a field intensity distribution pattern.

FIG. 11 shows the corresponding mode 1110. Each resonator in the energy source 920 and the energy sink 930 are excited in this resonant mode, and the energy is evenly distributed oscillating along and between the two arrays.

Two-Dimensional Resonant Arrays

FIG. 12 shows how the array of resonant objects can be of different dimensions, e.g., a two-dimensional (2D) array of the resonant objects. The 2D arrays extending in both the x and y direction, and is used as the energy source 1240 and the energy sink 1230. The energy driver 1260 provides 1250 the energy to the energy source at the resonant frequency. Due to the mutual coupling, 1270-1273, between the resonant objects in the energy source, wireless energy redistributed over the system in both direction. The mutual coupling 1274 between the resonant objects in the energy sources and the resonant objects in the energy sink results in the wireless energy transfer from the energy source 1240 to the energy sink 1230. The corresponding resonant mode of the overall system is excited through the providing energy at the resonant frequency. At the corresponding resonant mode, the energy in the system 1200 is redistributed in 3 directions. Particularly, the energy is transferred wirelessly in the z direction.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A system for exchanging energy wirelessly, comprising:
   a first array of at least three objects having a resonant frequency, each object is electromagnetic (EM) and non-radiative, and generates an EM near-field in response to receiving the energy, wherein each object in the first array is arranged at a distance from all other objects in the first array, wherein the objects are uniformly distributed in the first array, such that upon receiving the energy the object is strongly coupled to at least one other object in the first array via a resonant coupling of evanescent waves;
   a second array of objects including at least three objects, each object in the energy source and energy sink has a resonant frequency, is electromagnetic (EM) and non-radiative and generates an EM nearfield in response to receiving the energy; and
   an energy driver for providing the energy at the resonant frequency to at least one object in the first array, such that, during an operation of the system, the energy is distributed from the object to all other objects in the array and oscillates among the objects of the array in such a way that each object in the first array is configured to exchange the energy wirelessly with the second array via the resonant coupling of evanescent waves, and wherein the second array is configured to move with respect to the first array during the energy exchange with at least one degree of freedom.

2. The system of claim 1, wherein the energy driver provides the energy to more than one object.

3. The system of claim 1, wherein the array has a complex shape.

4. The system of claim 1, wherein the array is multi-dimensional.

5. The system of claim 1, further comprising:
   an energy sink for receiving the energy wirelessly from at least one object of the array via a coupling of evanescent waves.

6. The system of claim 5, wherein the energy sink is arranged such that the energy is received concurrently from multiple objects of the array.

7. The system of claim 5, wherein the energy sink is movable with respect to the array.

8. The system of claim 5, wherein the energy sink is a resonant object having the resonant frequency.

9. A system configured to exchange energy wirelessly, comprising:
   an energy source comprising a first array of objects including at least three objects;
   an energy sink comprising a second array of objects including at least three objects, each object in the energy source and energy sink has a resonant frequency, is electromagnetic (EM) and non-radiative, and generates an EM near-field in response to receiving the energy;
   an energy driver for providing the energy at the resonant frequency to at least one object in the energy source, such that, during an operation of the system, the energy is distributed from the object in the energy source to all other objects in the energy source; and
   a load from receiving the energy from the energy sink, wherein each object in the first and the second arrays is arranged at a distance from all other objects in, respectively, the first and the second arrays, such that upon receiving the energy the objects in the first and the second arrays are strongly coupled to, respectively, at least one other object in the first and the second array, via a resonant coupling of evanescent waves, and wherein the energy sink is arranged to receive energy wirelessly from the energy source via the resonant coupling of one or many objects in the first array with one or many objects in the second array, wherein the distance between objects of the first arrays is less than a distance between the energy source and the energy sink, and wherein the second array is configured to move with respect to the first array during the energy exchange with at least one degree of freedom.

10. The system of claim 9, wherein a size of the first array is greater than a size of the second array.

11. The system of claim 9, wherein a size of the first array equals a size of the second array.

12. The system of claim 9, wherein the first array and the second array are two-dimensional arrays.

13. The system of claim 9, wherein the energy driver provides the energy concurrently to multiple objects of the energy source.

14. The system of claim 9, wherein the load receives the energy concurrently from multiple objects of the energy sink.

\* \* \* \* \*